Patented July 15, 1941

2,248,999

UNITED STATES PATENT OFFICE 2,248,999

COMPOSITION FOR LINING DENTAL PLATES

William E. Johnson, Detroit, Mich.

No Drawing. Application April 12, 1939,
Serial No. 267,458

8 Claims. (Cl. 106—6)

This invention relates to compositions of matter and particularly compositions for lining dental plates.

It is well known that the extraction of teeth produces a considerable but gradual change in form of the oral cavity and particularly of the alveolar regions, such change extending over a period of many months. Consequently, unless the fitting of dental plates is delayed to an impractical extent, they eventually become loose and unsatisfactory, even if originally accurately fitted.

Furthermore, the original fitting of dental plates often involves material inaccuracies, since the plastic material employed in taking impressions is usually placed under considerable pressure to conform it to the jaws, causing the jaw tissues to yield materially from their normal position and shape, particularly along the alveolar ridges. Thus the impressions fail to reproduce normal contours of said ridges.

It has been recognized that suitable coatings applied to the seating faces of loose-fitting dental plates may ameliorate dental practice as above discussed, and it has become quite common to sprinkle said seating faces with various powders convertible by saliva into a paste producing considerable adhesion between the plates and jaws. Such coatings, however, require frequent renewal and fail to secure for an ill fitting plate full benefits of an accurate fit.

The present invention seeks to provide a composition for lining or relining dental plates and for lining dental base-plates, that may be quickly and easily applied and requires no replacement over a long period of time.

Another object is to provide a composition that is strongly adhesive to dental plates but non-adhesive to the tissues of the mouth.

A further object is to provide a composition for the purpose specified lacking appreciable taste or odor, and presenting a perfectly smooth and non-irritating surface to the tissues of the mouth.

A further object is to provide a composition for the purpose specified having sufficient initial softness to fully conform itself to the jaw tissues, yet adapted to so harden in a few hours time as to retain an accurate impression.

In its preferred form, my composition comprises the ingredients and proportions below given, together with a suitable coloring agent:

Rosin _____ pounds__ 1
Gum copal _____ do____ 1
Talc _____ do____ 4
Ethyl alcohol _____ quarts__ 1

These ingredients should be substantially pure and the alcohol is preferably at least one hundred and ninety proof. Synthetic rosin as at present available is not suited to my purpose.

In mixing said ingredients, there is first dissolved in the alcohol a suitable amount of coloring matter, the nature thereof being unimportant, provided it is non-toxic, tasteless, contains no oil, and is insoluble in water. The rosin and gum copal, in thoroughly pulverized form, are gradually added to the alcohol while constantly agitating the mixture. Agitation is continued until the mixture assumes the form of a thin, syrupy, and uniform solution. The talc, in pulverulent form, is now added gradually while continuing agitation, and agitation is prolonged until a substantially uniform dispersion of the talc is obtained.

The resulting composition is highly viscous while sufficiently plastic to be readily spread on a desired surface. Adhesive properties of the composition are derived primarily from the rosin and to a lesser degree from the gum copal. The latter primarily serves to secure for the composition a desired cohesiveness not accruing from the rosin alone. Thus the gum copal prolongs the useful life of a denture lining, and its use additional to the rosin eliminates a resinous taste that would otherwise be perceptible.

The talc imparts a suitable thickness or body to the composition, and lends itself to this use by reason of its insolubility, its availability in pulverulent form, and its lack of appreciable taste or odor. It is susceptible of thorough mixing with the other ingredients and assures a smooth surface for a lining formed by the composition and avoidance of irritation to the highly sensitive tissues of the mouth.

Alcohol is especially suited as a vehicle for the described composition, in that it readily dissolves or suspends the solid ingredients. Also its volatility is such that body heat will in a few hours time sufficiently drive off alcohol from a plate lining formed of the composition to effect a desired hardening of such lining.

It is a peculiar and highly desirable characteristic of the composition as used on dentures, that it does not become completely hard, but acts as a slightly elastic cushion between the plates and surfaces seating the latter. This adds materially to the comfort with which the plates may be worn.

In use of said composition for lining or relining dental plates, the aforementioned gradual hardening of the coating is of material importance, since a quickly setting composition would not afford the displaced tissues adequate time to return to their normal position and shape during the hardening interval.

The composition lends itself perfectly to the practice, now followed to some extent, of fitting a patient with dentures immediately or shortly after extraction, permitting ready compensation as often as required for the subsequent shrinkage of the alveolar ridges.

In producing original dentures, the composition can be employed to assure a maximum perfection of fit by using an impression taken from the jaws as a mold for a model, on which a fairly stiff base plate is formed, the latter then being coated with the composition preliminary to its use in taking a final impression from the jaws. By adoption of this practice, it has been found feasible to obtain accurate fittings in cases in which extreme neglect and resultant distortion of the jaws would otherwise prohibit satisfactory dentures.

The non-toxic character of all the ingredients employed in the disclosed composition is to be noted. After prolonged use, a lining formed of said composition gradually disintegrates as pulverulent material such as may generally be readily ejected, but no detriment results from swallowing thereof.

The invention is presented as including all such modifications and changes as come within the scope of the following claims.

What I claim is:

1. A viscous composition for dental use, comprising rosin and gum copal, mixed to a spreading consistency in an alcohol vehicle with a pulverulent, substantially tasteless body, substantially insoluble in such vehicle.

2. A composition for dental use, comprising rosin and gum copal, and a body of pulverulent talc, mixed with alcohol to form a highly viscous plastic mass.

3. A composition for dental use, comprising substantially equal parts by weight of rosin and gum copal, mixed with alcohol and with a weight of pulverulent talc approximating twice the combined weight of the rosin and gum copal, to form a viscous mass of a consistency affording free spreading of such mass under pressure.

4. A composition for dental use, comprising substantially equal parts by weight of rosin and gum copal, mixed with a non-toxic liquid volatile at body temperature and with pulverulent talc of approximately twice the combined weight of the rosin and gum copal, and forming a viscous mass of spreading consistency.

5. A viscous composition for dental use at substantially atmospheric temperature comprising ethyl alcohol as a vehicle, resinous material to impart adhesiveness and cohesiveness, and pulverulent talc to thicken the composition to a spreading consistency.

6. A composition for dental use, comprising the following ingredients in substantially the proportions given:

| | |
|---|---|
| Rosin | pounds__ 1 |
| Gum copal | do____ 1 |
| Talc | do____ 4 |
| Ethyl alcohol | quarts__ 1 |

7. A composition for dental use, comprising substantially equal parts by weight of rosin and gum copal, mixed with alcohol and with a pulverulent, substantially tasteless body approximating twice the combined weight of the rosin and gum copal, to form a viscous mass of a consistency affording free spreading of such mass under pressure.

8. A composition for dental use, comprising substantially equal parts by weight of rosin and gum copal, mixed with a non-toxic liquid volatile at body temperature and with a pulverulent, substantially tasteless body of approximately twice the combined weight of the rosin and gum copal, and forming a viscous mass of spreading consistency.

WILLIAM E. JOHNSON.